Patented Mar. 20, 1934

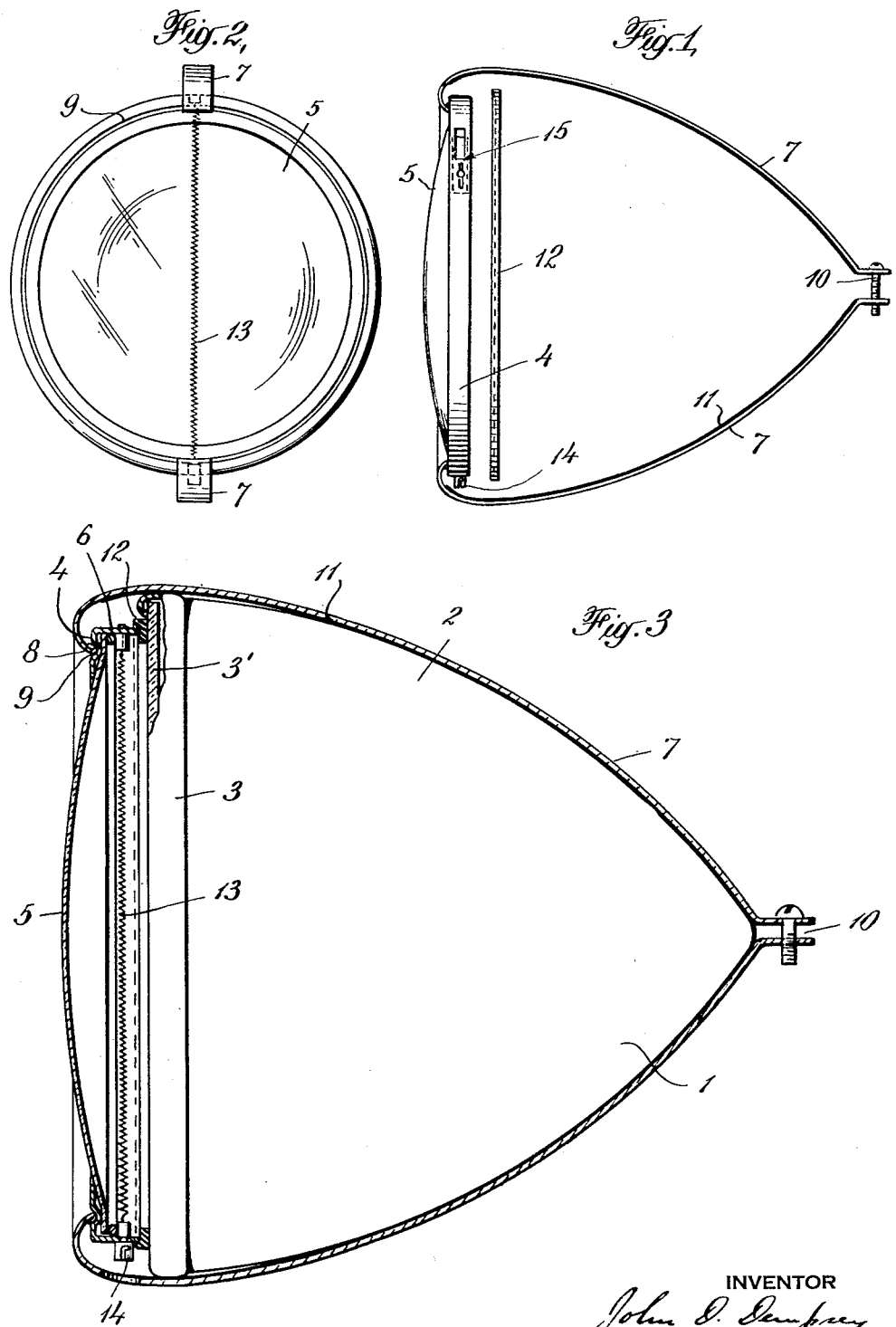

1,951,902

UNITED STATES PATENT OFFICE 1,951,902

HEATER ATTACHMENT FOR AUTOMOBILE HEADLAMPS AND THE LIKE

John D. Dempsey, Olean, N. Y.

Application February 25, 1932, Serial No. 595,083

3 Claims. (Cl. 219—19)

This invention relates to heater attachments for preventing the adherence of snow and ice to the lenses of automobile head lamps, search lights, etc.

Heaters have already been proposed for maintaining the transparency of various surfaces by keeping them free of ice, snow and moisture, among them being heaters designed for use on windows and automobile windshields, but so far as I am aware no one has provided a heater attachment adapted for use on an automobile head lamp or similar lamp. It is the principal object of this invention to provide a heater attachment which is peculiarly adapted for such use.

A heater attachment embodying the invention is illustrated in the accompanying drawing in which:

Figure 1 is a side view of the attachment.

Fig. 2 is a front elevation of the attachment, and

Fig. 3 is a side view showing the attachment applied to a head lamp, the head lamp being shown in elevation and the attachment in section.

An automobile head lamp is represented at 1. The detail construction forms no part of the invention, it being sufficient to note for the purpose of this description that it comprises the usual casing 2 and a rim 3 which holds the usual lens 3'.

The attachment itself comprises a ring-like frame 4 in which there is mounted a glass disc or lens 5. The frame 4 has a horizontal flange 6, the rear edge of which is adapted to be retracted against the lens 3' of the head lamp or against the head lamp rim. The diameter of the flange 6 should therefore preferably be of the same order as the diameter of the lamp lens.

In order to hold the attachment in place on the head lamp a pair of rearwardly extending flexible strips 7, preferably made of thin sheet metal, are caused to engage the frame 4 and clamp it to the head lamp. The forward ends 8 of strips 7 may engage in a groove 9 provided for the purpose in the front wall of frame 4 as shown in Figs. 2 and 3. The strips 7 are designed to embrace the casing 2 of the head lamp and to be connected together at their rear ends by means of a screw or other fastening device 10. When the screw 10 is tightened, it draws the frame 4 of the attachment rearwardly against the lens of the head lamp. The strips 7 may be lined with felt or other soft material 11 so they will not mar the casing 2. Preferably, a ring-shaped rubber gasket 12 is interposed between the flange 6 of the attachment and the head lamp lens to form an airtight seal between the outside air and the interior compartment located between the head lamp lens and the lens 5 of the attachment. Located within the frame 6 is an electric heater unit 13 to which current may be supplied from the automobile storage battery. A socket 14 located on the outside of the attachment frame 6 is electrically connected with the heater unit 13 and is designed to receive a plug on a conductor which extends to the storage battery. An adjustable shutter 15 on the frame 6 may be provided so that the amount of heat confined by the attachment may be regulated.

The attachment is inexpensive to manufacture as it comprises but few parts and they are all of a simple nature. It may be easily and quickly applied to a head lamp and will be found useful in cold climates where an accumulation of ice and snow on the lenses of the head lamp ordinarily interferes with proper illumination of the roadway. The heater unit should be designed to furnish sufficient heat to accomplish its purpose of keeping the lens free of snow and ice and should it be necessary to regulate the temperature within the attachment, the shutter 15 may be adjusted.

The front elevation of the attachment should substantially correspond in shape and area with that of the head lamp and the clamping means, which in the particular form of the device described above comprises the strips 7, should extend rearwardly from the attachment frame and be of such a nature that it can be applied to the curved walls of the head lamp casing. These conditions can be fulfilled by clamping or fastening means of other types than the particular one herein described.

While the heater unit 13 is shown as extending diametrically across the attachment frame, it can, of course, be positioned in any other desired way.

I claim:

1. A heater attachment for lamps of the type having a lens through which the light passes, comprising a frame whose front elevation substantially corresponds in shape and area with that of the lamp, transparent material carried by the frame and constituting the front wall of the attachment, an electric heater unit within the frame, and means engaging said frame and adapted to encircle a part of the lamp located at the rear of said lens to retract the attachment against the front wall of the lamp and form a heating compartment between the lamp lens and the attachment.

2. A heater attachment comprising a frame open at its rear, transparent material carried by the frame and constituting the front wall of the attachment, an electric heater unit within the frame, and clamping means extending rearwardly from the frame and having a curvature such that the clamping means may be applied to the casing of an automobile head lamp or the like whereby the attachment may be used to form a heating compartment against the lens of the lamp.

3. A heater attachment for lamps of the type having a lens through which the light passes comprising a frame, transparent material carried by the frame and constituting the front wall of the attachment, a heater unit within the frame and means for fastening the attachment to the lamp to form a heating compartment between the lamp lens and the attachment, said means comprising clamping members engaging the attachment and extending rearwardly therefrom, and means associated with the clamping members for retracting them towards the walls of the lamp casing.

JOHN D. DEMPSEY.